(12) United States Patent
Lee et al.

(10) Patent No.: US 7,961,258 B2
(45) Date of Patent: Jun. 14, 2011

(54) IMAGE DISPLAY APPARATUS HAVING SOUND LEVEL CONTROL FUNCTION AND CONTROL METHOD THEREOF

(75) Inventors: Su Jin Lee, Daegu-si (KR); Ji Eun Youn, Sungnam-si (KR)

(73) Assignee: LG Electronics Inc., Seoul (KR)

( * ) Notice: Subject to any disclaimer, the term of this patent is extended or adjusted under 35 U.S.C. 154(b) by 2072 days.

(21) Appl. No.: 10/915,331

(22) Filed: Aug. 11, 2004

(65) Prior Publication Data
US 2005/0036069 A1 Feb. 17, 2005

(30) Foreign Application Priority Data
Aug. 11, 2003 (KR) .................. 10-2003-0055381

(51) Int. Cl.
H04N 5/60 (2006.01)
H04N 5/44 (2006.01)

(52) U.S. Cl. .................................... 348/738; 348/553
(58) Field of Classification Search .................. 348/738, 348/569, 484, 485; 381/56, 58, 71.1, 73.1, 381/94.1, 94.7, 104, 105, 107, 108, 306; 704/246, 271
See application file for complete search history.

(56) References Cited

U.S. PATENT DOCUMENTS

| | | | | |
|---|---|---|---|---|
| 4,933,768 A * | 6/1990 | Ishikawa et al. | ............... | 348/738 |
| 5,289,288 A * | 2/1994 | Silverman et al. | ............... | 386/97 |
| 5,548,346 A * | 8/1996 | Mimura et al. | ............... | 348/738 |
| 5,852,438 A * | 12/1998 | Tomizawa et al. | ............ | 715/738 |
| 6,067,126 A * | 5/2000 | Alexander | ..................... | 348/738 |
| 6,188,439 B1* | 2/2001 | Kim | ............................. | 348/553 |
| 6,333,763 B1* | 12/2001 | Tanaka | ......................... | 348/484 |
| 6,909,471 B2* | 6/2005 | Bayley | ......................... | 348/738 |
| 2002/0067436 A1* | 6/2002 | Shirahama et al. | ........... | 348/725 |
| 2002/0078447 A1* | 6/2002 | Mizutome et al. | .............. | 725/37 |
| 2002/0107909 A1* | 8/2002 | Eyer et al. | ..................... | 709/203 |
| 2003/0007001 A1 | 1/2003 | Zimmerman | | |
| 2003/0189674 A1* | 10/2003 | Inoue et al. | ................... | 348/738 |

FOREIGN PATENT DOCUMENTS

| | | | |
|---|---|---|---|
| JP | 2001-298680 A | 10/2001 |
| KR | 1020010001250 A | 1/2001 |

* cited by examiner

*Primary Examiner* — Victor Kostak
(74) *Attorney, Agent, or Firm* — Birch, Stewart, Kolasch & Birch, LLP

(57) ABSTRACT

The present invention relates in general to an video display apparatus, more particularly, to an video display apparatus having an sound level control function according to program genre or speaker of a received broadcast program.

9 Claims, 4 Drawing Sheets

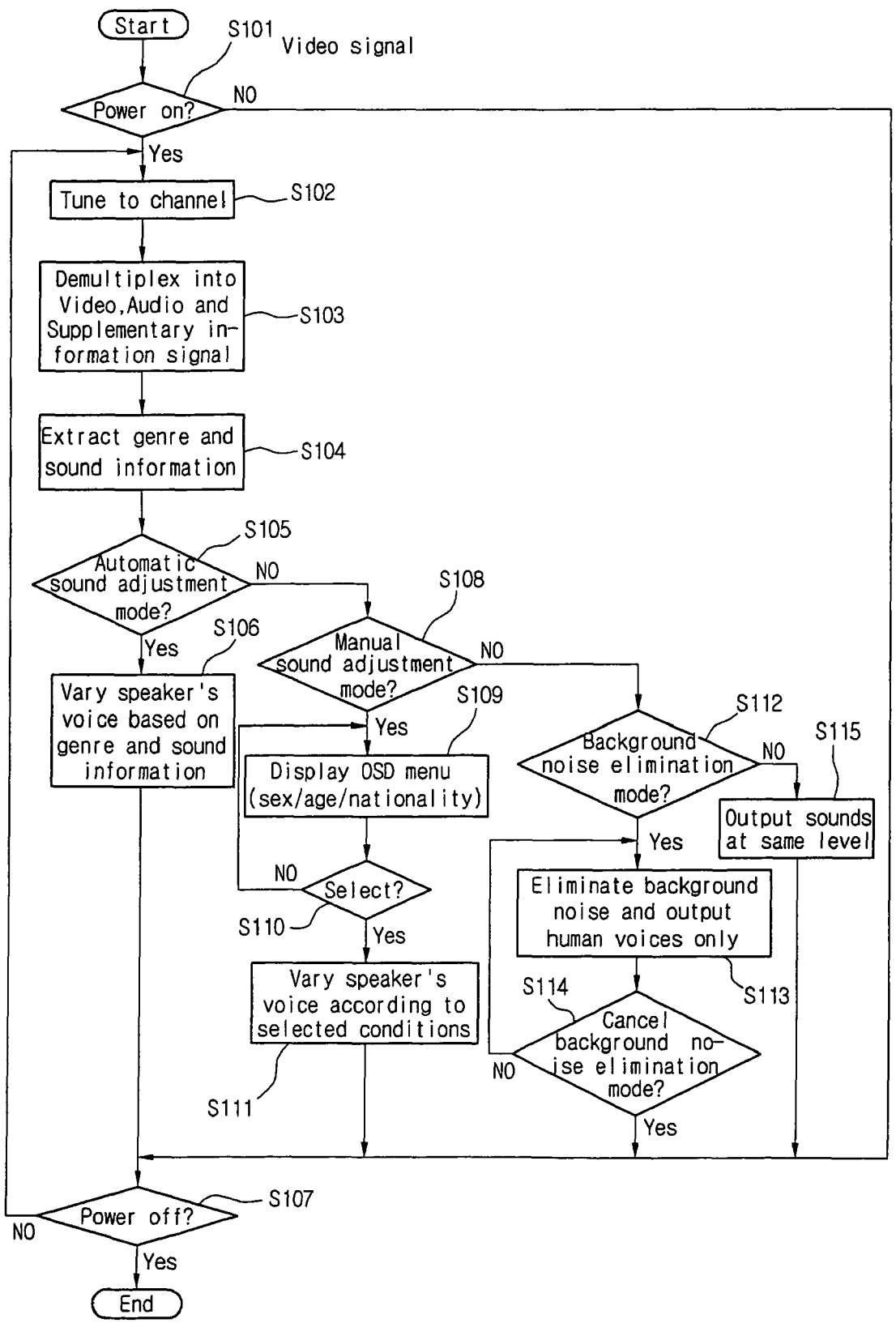

Fig.4

| Channel | |
|---|---|
| Video | Automatic sound adjustment mode ● |
| Audio | Manual sound adjustment mode ○ |
| Time | Background noise elimination mode ○ |
| Others | |

Fig.5

| Channel | |
|---|---|
| Video | Automatic sound adjustment mode ○ |
| Audio | Manual sound adjustment mode ● |
| Time | Background noise elimination mode ○ |
| Others | |

| Sex | Female ☑ | Male ☐ | | |
|---|---|---|---|---|
| Age | Adult ☑ | Senior ☐ | | |
| Nationality | Native ☐ | Foreigner ☑ | | |
| Music | Singer ☐ | Drum ☑ | Piano ☐ | Saxophone ☐ |

Fig.6

| Channel | Sound level |
|---|---|
| Video | 30% increase ○ |
| Audio | 20% increase ● |
| | 10% increase ○ |
| Time | 10% decrease ○ |
| | 20% decrease ○ |
| Others | 30% decrease ○ |

IMAGE DISPLAY APPARATUS HAVING SOUND LEVEL CONTROL FUNCTION AND CONTROL METHOD THEREOF

This Non-provisional application claims priority under 35 U.S.C. §119(a) on Patent Application No(s). 10-2003-0055381 filed in Korea, Republic of on Aug. 11, 2003, the entire contents of which are hereby incorporated by reference.

BACKGROUND OF THE INVENTION

1. Field of the Invention

The present invention relates in general to an video display apparatus, more particularly, to an video display apparatus having an sound level control function according to program genre or speaker of a received broadcast program.

2. Discussion of the Background Art

In general, an video display apparatus is used for displaying video. Typical examples of the video display apparatus are TVs or monitors.

For example, the TV displays broadcast signals from a broadcasting station selected by a televiewer. With advances in multimedia technology, analog TVs have been gradually replaced by digital TVs.

Particularly, the digital TV differs from the analog TV in that it provides many kinds of additional services including home shopping, electronic newspapers, and (stock) trading information. Also, through an effective usage of bandwidth, more broadcasting channels are now available.

The structure of a related art digital TV will now be explained with reference to FIG. 1.

FIG. 1 is a schematic block diagram of a related art digital TV.

As shown in FIG. 1, the related art digital TV includes a tuner 10 for tuning into a broadcast signal; a DeMux 20 for demultiplexing the tuned broadcast signal by the tuner 10, that is, a transport stream which is multiplexed on a frame or time basis into audio, video and supplementary information; an video signal processor 50 for receiving the demultiplexed video signal from the DeMux 20 and processing it to a signal displayable on a display 60; a audio signal processor 30 for receiving the demultiplexed audio signal from the DeMux 20 and processing it to a signal outputable by a speaker 40; a user interface 70 enabling a user to input a request; a controller 80 for outputting a control signal corresponding to the request inputted through the user interface 70; and a memory 90 for storing the supplementary information demultiplexed by the DeMux 20.

The operation of the above-described digital TV is as follows.

A user inputs a power on command and selects a desired channel. Then, the tuner 10 tunes into the channel selected by the user, and the broadcast signal received to the channel is inputted to the DeMux 20 and is demultiplexed into an video signal, a audio signal, and supplementary information signal.

The demultiplexed video signal is inputted to the video signal processor 50 and is processed to be displayable on the display 60, while the demultiplexed audio signal is inputted to the audio signal processor 30 and is processed to be the signal outputable by the speaker 40.

However, the related art digital TV has the following problems.

First, the broadcasting station transmits a certain sound level, and the digital TV outputs sound according to the magnitude the user has set for the sound, irrespective of program genre or speaker of a received broadcast. Therefore, it is impossible for the user to listen to the broadcast at the sound level according to his or her preference.

Second, especially when the user watches a foreign language program and wants to learn more accurate pronunciation of a native speaker of the foreign language, he or she has to increase the audio level (or the sound level) every time the native speaker speaks.

Third, the digital TV outputs every sound regardless of what the user wants. Thus, the user has to put up with the sound he or she does not really want to hear.

SUMMARY OF THE INVENTION

An object of the invention is to solve at least the above problems and/or disadvantages and to provide at least the advantages described hereinafter.

Accordingly, one object of the present invention is to solve the foregoing problems by providing an video display apparatus with a sound level control function and a control method thereof, through which a user is able to control the sound level of a speaker of a certain broadcast program according to his or her preference, such as, elimination of background noises.

The foregoing and other objects and advantages are realized by providing an video display apparatus equipped with a tuner, a memory and a speaker, and having a sound control function the apparatus, wherein the apparatus includes: a DeMux for demultiplexing a broadcast signal of a channel that is tuned through the tuner at user's request into video signal, audio signal, and supplementary information; a sound data extractor for extracting sound data of each speaker from the supplementary information demultiplexed by the DeMux; an video signal processor for receiving the video signal demultiplexed by the DeMux and processing the video signal to be displayable, and processing all menu screens to be displayable in an OSD form; a controller, by which the sound data extracted by the sound data extractor is stored in the memory, the level of the extracted sound is varied according to a sound adjustment mode selected by the user referring to the OSD menu, and the sound is outputted; and a audio signal processor for varying the sound level of the audio signal demultiplexed by the DeMux, according to a control signal from the controller, and processing the audio signal to be outputable by the speaker.

According to another aspect of the invention, an video display apparatus for providing video signal, audio signal, and supplementary information extracted from a broadcast signal includes: a sound data extractor for extracting the sound level of the audio signal, and information of an object that generates the audio signal; an video signal processor for providing a user interface to control the video signal and the sound level; a controller for extracting from the supplementary information a program genre information where the broadcast signal belongs, and varying the sound level of a received audio signal according to a preset sound level by a user, and a audio signal processor for processing the sound signal to be outputable from a speaker, according to the sound level varied by the controller.

According to another aspect of the invention, a control method of an video display apparatus equipped with a sound data extractor and a memory and having a sound level control function, wherein the method includes the steps of: allowing a user to select a desired sound adjustment mode; storing in the memory the sound data extracted by the sound data extractor, and varying the sound level based on the sound level information of each speaker, the information being extracted by the sound data extractor and stored in the memory, according to the sound adjustment mode selected by the user, and then outputting the sound.

According to another aspect of the invention, a control method of an video display apparatus capable of controlling the sound level of a audio signal extracted from a broadcast signal includes the steps of: allowing a user to select conditions for the variation of the sound level through a user interface; extracting an object generating the audio signal and the sound level thereof from supplementary information that is extracted from the audio signal and the broadcast signal; and varying the sound level of the audio signal-generating object on the basis of the user's request.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 3 is a flow chart describing a control method of an video display apparatus with a sound level control function according to the present invention; and FIGS. 4 to 6 show different embodiments of a control method of an video display apparatus with a sound level control function according to the present invention.

DETAILED DESCRIPTION OF PREFERRED EMBODIMENTS

The following detailed description will present an video display apparatus with a sound level control function and a control method thereof according to a preferred embodiment of the invention in reference to the accompanying drawings.

Figure 1:
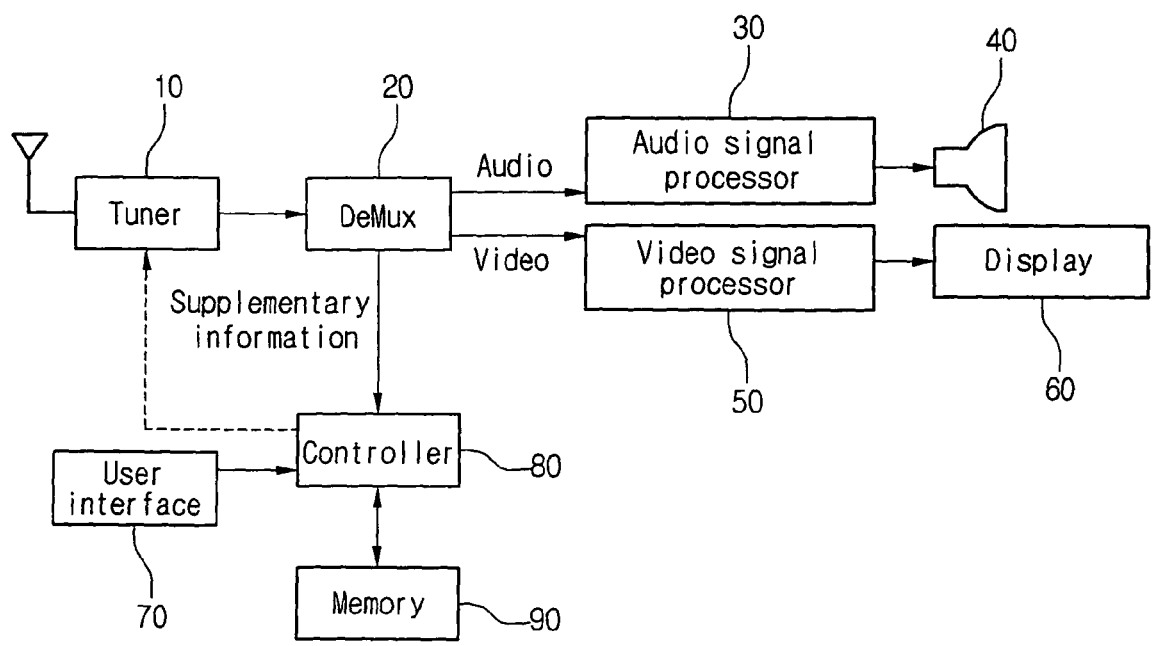
FIG. 1 is a schematic block diagram of a related art video display apparatus.
Figure 2:
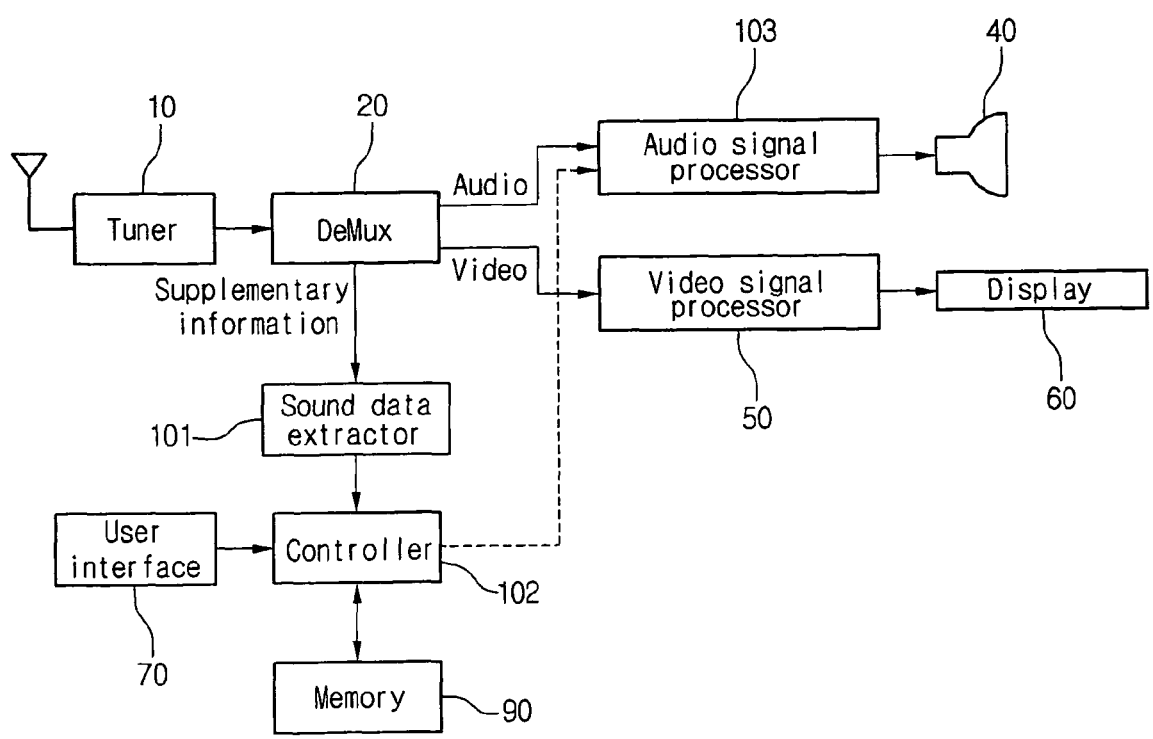
FIG. 2 is a schematic block diagram of an video display apparatus with a sound level control function according to the present invention.

FIG. 2 is a schematic block diagram of an video display apparatus with the sound level control function according to the present invention; FIG. 3 is a flow chart describing a control method of the video display apparatus with the sound level control function according to the present invention; and FIGS. 4 to 6 show different embodiments of the control method of the video display apparatus with the sound level control function according to the present invention.

The present invention enables a user to control the sound level from a broadcasting station according to the user's preference. Normally, in a broadcasting program, sound signals are transmitted using different sound levels according to characters or circumstances in the program. Then, the user (or the viewer) controls the magnitude of the sound outputted by the TV to listen to the audio.

Therefore, the main problem of the related art video display apparatus was that even though the user increases the magnitude of sound of a particular character or an instrument only, the volume of the rest of characters or instruments is also increased.

To solve the above problem, the present invention provides an video display apparatus and a control method thereof, capable of changing the sound level transmitted from a broadcasting station, not the magnitude of the sound outputted by the TV.

As depicted in FIG. 2, the video display apparatus with the sound level control function includes a tuner 10 for tuning into a broadcast signal received through an antenna; a DeMux 20 for receiving the tuned broadcast signal from the tuner 10 and demultiplexing the broadcast signal into audio signal, video signal and supplementary information signal; a sound data extractor 101 for extracting sound data of each speaker from the supplementary information signal demultiplexed by the DeMux 20; a user interface 70 enabling a user to input a request; a controller 102, if the user sets the sound level in automatic mode by using the user interface 70, for controlling the extraction of sound data of each speaker from the sound data extractor 101 and varying the sound of a particular speaker at user's request; a audio signal processor 103 for receiving the demultiplexed audio signal from the DeMux 20 and processing it to a signal outputable by a speaker 40, in response to a control signal of the controller 102; and an video signal processor 50 for receiving the demultiplexed video signal from the DeMux 20 and processing it to a signal that is displayable on a display 60.

The operation of the above-described video display apparatus with the sound level control function will now be described below.

The user selects a desired channel through the user interface 70. Then, the tuner 10 tunes into the channel selected by the user, and the broadcast signal received to the channel is inputted to the DeMux 20 and is demultiplexed into an video signal, a audio signal, and supplementary information signal.

The demultiplexed video signal is inputted to the video signal processor 50 and is processed to be displayable on the display 60.

Also, the demultiplexed audio signal is inputted to the audio signal processor 103 and is processed to be the signal outputable by the speaker 40.

If the user wants to change the sound level that is preset according to program by the broadcasting station, he or she can change it by selecting a desired condition on a menu as shown in FIG. 4.

Therefore, the menu for adjusting the sound level is displayed to the user and thus, the video display apparatus is able to output the magnitude of corresponding sound according to whether the user selects an automatic sound adjustment mode, a manual sound adjustment mode, or a background noise elimination mode.

In other words, if the user selects the automatic sound adjustment mode, the controller 102 checks the genre of a program the user selected, and extracts sound level information per speaker of the program, and varies the magnitude of the sound of each speaker according to the program genre. Here, the program genre is extracted by the controller 102 from the supplementary information signal.

For example, if the user wants to learn a foreign language, say English, the user will select a channel that broadcasts English-language teaching programs. In this case, the controller 102 analyzes the program genre of the selected channel and confirms that the program is for teaching languages. Then, the controller 102 extracts from the sound data extractor 101 the information of an English native speaker, and controls the sound of the English native speaker to be outputted louder than others including the MC of the program. Thus, the sound level of the English native speaker is now increased to a higher level from the originally transmitted sound level from the broadcasting station.

Traditionally, when a music show for example is broadcasted, many times the audience is too loud to listen to the MC of the program. However, according to the present invention, if the show genre is tuned, the controller 102 extracts from the sound data extractor 101 the information of the MC, and controls the sound of the MC to be outputted louder.

In the meantime, if the user selects the manual sound adjustment mode, a menu of FIG. 5 is displayed. As shown in FIG. 5, the user sets desired conditions, and based on these conditions, the video display apparatus of the invention outputs different levels of sound.

Suppose that the user wants to listen to a specific instrument (e.g., a drum) or the singer more clearly than the others. In this case, the user should select the manual sound adjustment mode, and marks the instrument or the singer he or she wants to be louder.

FIG. 6 illustrates a menu through which the user can specifically increase or decrease the degree of the sound level.

Usually in the automatic sound adjustment mode, the sound level transmitted form the broadcasting station is increased by 20% when it is outputted by the video display apparatus of the invention. But again, the user can freely increase or decrease the sound level according to his or her preference.

The control method of the video display apparatus with the sound level function will now be described with reference to FIG. 3. When the user inputs a power on command, and a user-selected channel is tuned (S101-S102).

And, the broadcast signal of the tuned channel is demultiplexed into video, audio and supplementary information signal (S103).

Out of the supplementary information signal, the genre and sound information is extracted (S104).

Then, it is decided whether the user selected the automatic sound adjustment mode (S105).

If it turns out that the user selected the automatic sound adjustment mode, the controller varies the sound of each speaker based on the genre of the user-selected program and the sound data extracted from the sound data extractor, and outputs the resulting sound (S106).

Later, if the user inputs a power off command, the control procedure ends (S107).

On the other hand, if it turns out that the user did not select the automatic sound adjustment mode, it is decided whether the user selected the manual sound adjustment mode (S108).

If the user selected the manual sound adjustment mode, a menu including various sound level adjustment conditions is displayed (S109).

As shown in FIG. 5, the menu displayed to the user includes sex (male or female), age (adult or senior), nationality (native or foreigner), and music (singer, drum, piano, and saxophone). Therefore, the user can select one or more items he or she wants. For example, the user can select only one item, say 'female', or two items, say 'female' and 'foreigner' at the same time.

Once the user selects the conditions he or she wants on the menu, the sound of each speaker is varied and outputted according to the conditions set by the user (S110).

Lastly, if it turns out that the user did not select the manual sound adjustment mode, it is decided whether the user selected the background noise elimination mode (S111).

If so, the controller extracts the information on the background noises from the supplementary information signal, and ensures that the background noises are eliminated during the audio signal process and only the human voice is outputted (S112).

And, it is decided whether the user cancels the background noise elimination mode (S113).

If the user cancelled the function, it is decided whether the user inputted the power off command to end the procedure.

However, if the user has not selected the background noise elimination mode (S111), the video display apparatus of the invention simply outputs the sound as predetermined by the broadcasting station, that is, the sound of each speaker is equivalent in magnitude (S114).

As described above, by applying the video display apparatus with the sound level control function and the control method thereof, it is now possible to vary the sound level of a broadcast program according to the genre or speaker of the broadcast program Therefore, even though the traditional digital TV user could increase or decrease only the magnitude of the sound level transmitted from the broadcasting station, the present invention digital TV user is able to eliminate background noises for example, or to listen to the MCs voice only.

In conclusion, the video display apparatus with the sound level control function and the control method thereof have the following advantages.

When watching a foreign language teaching program or movie, the user sometimes wants the voice of the native speaker of the foreign language to be louder than others. In this case, the supplementary information signal is demultiplexed from the broadcast signal transmitted from the broadcasting station, and audio level information of the corresponding speaker is extracted from the supplementary information signal and is increased according to the user's preference. Thus, the user can more clearly listen to the speaker he or she wants to focus on, without adding additional operations on the sound level, and this greatly improves the user's satisfaction.

Also, if the user wants to list only human voices, he or she can eliminate the background noises by setting the mode accordingly. In this way, the user can watch the program in desired state.

While the invention has been shown and described with reference to certain preferred embodiments thereof, it will be understood by those skilled in the art that various changes in form and details may be made therein without departing from the spirit and scope of the invention as defined by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An image display apparatus equipped with a tuner, a memory and a speaker, and having a sound control function, wherein the apparatus comprises:
   a DeMux for demultiplexing a broadcast signal of a channel that is tuned through the tuner at user's request into image signal, voice signal, and program specific information;
   a sound data extractor for extracting sound data which is an object generating the voice signal and the sound level from the program specific information demultiplexed by the DeMux;

an image signal processor for receiving the image signal demultiplexed by the DeMux and processing the image signal to be displayable, and processing all menu screens to be displayable in an OSD form;

a controller for extracting from the program specific information a program genre information and sound level information of the program genre where the broadcast signal belongs, and varying the sound level of the voice signal according to the program genre; and a voice signal processor for varying the sound level of the voice signal demultiplexed by the DeMux, according to a control signal from the controller, and processing the voice signal to be outputable by the speaker.

2. The apparatus according to claim 1, wherein the sound adjustment mode selected by the user includes an automatic sound adjustment mode, a manual sound adjustment mode, and a background noise elimination mode.

3. An image display apparatus for providing image signal, voice signal, and program specific information extracted from a broadcast signal, the apparatus comprising:

a sound data extractor for extracting the sound level of the voice signal, and information of an object that generates the voice signal;

an image signal processor for processing the image signal to be displayable, and processing all menu screens to be displayable in an OSD form;

a controller for extracting from the program specific information a program genre information where the broadcast signal belongs, and varying the sound level of a received voice signal from each object that generates the voice signal according to a preset sound level by a user according to a preset sound level by the user; and a voice signal processor for processing the sound signal to be outputable from a speaker, according to the sound level varied or a background noise eliminated by the controller.

4. The apparatus according to claim 3, wherein the information of the object generating the voice signal is preset by the user to vary the sound level of the object.

5. The apparatus according to claim 3, wherein the information of the object generating the voice signal whose sound level should vary is automatically set, according to the extracted genre information.

6. The apparatus according to claim 3, wherein the variation of the sound level is characterized of increasing or decreasing the sound level of the received voice signal.

7. A control method of an image display apparatus capable of controlling the sound level of a voice signal extracted from a broadcast signal, the method comprising the steps of:

allowing a user to select conditions for the variation of the sound level through a user interface;

extracting an object generating the voice signal and the sound level thereof from program specific information that is extracted from the voice signal and the broadcast signal; and varying the sound level of the voice signal-generating object or eliminating a background noise on the basis of the user's request.

8. The method according to claim 7, wherein program genre information is extracted from the program specific information, and according to the program genre information, the object generating a voice signal whose sound level should vary is automatically determined.

9. The method according to claim 7, further comprising the step of:

selecting an increment/decrement degree of the sound level.

\* \* \* \* \*